United States Patent
Day et al.

(10) Patent No.: US 6,779,272 B2
(45) Date of Patent: Aug. 24, 2004

(54) SINGLE PIECE FLOW BASED WING ASSEMBLY SYSTEM

(75) Inventors: Dan D. Day, Seattle, WA (US); Clayton L. Munk, Maple Valley, WA (US); Luis A. Perla, Sammamish, WA (US); Harry E. Townsend, Seattle, WA (US)

(73) Assignee: The Boeing Company, Chicago, IL (US)

( * ) Notice: Subject to any disclaimer, the term of this patent is extended or adjusted under 35 U.S.C. 154(b) by 53 days.

(21) Appl. No.: 10/231,884

(22) Filed: Aug. 30, 2002

(65) Prior Publication Data

US 2004/0040154 A1 Mar. 4, 2004

(51) Int. Cl.$^7$ ................................................. B23P 15/00
(52) U.S. Cl. ....................... 29/897.2; 29/407.01; 29/464
(58) Field of Search ........................... 29/897.2, 407.01, 29/434, 464, 467, 525.2, 564, 564.1, 701, 720, 772, 783, 787, 791, 795; 244/123, 124, 213, 215

(56) References Cited

U.S. PATENT DOCUMENTS

| 2,378,043 A | 6/1945 | Sorensen et al. |
| 6,314,630 B1 | 11/2001 | Munk et al. |

FOREIGN PATENT DOCUMENTS

| EP | 0593127 A | 4/1994 |
| GB | 2276600 A | 10/1994 |

*Primary Examiner*—I Cuda Rosenbaum
(74) *Attorney, Agent, or Firm*—Harness Dickey & Pierce P.L.C.

(57) ABSTRACT

A method for assembling wings includes supporting a pair of wing spars, which include a plurality of coordination features, upon a pair of stanchions in a generally horizontal position. A plurality of ribs and wing panels are accurately fastened to the pair of wing spars at a first workstation using the coordination features to position accurately the parts. The combination is transferred to downstream workstations via a ground transport vehicle for further processing and assembly to define a pulsed flow wing assembly system.

25 Claims, 8 Drawing Sheets

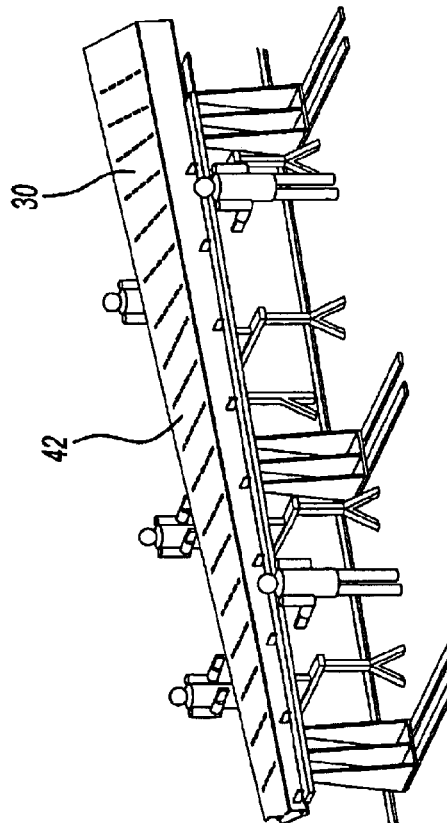
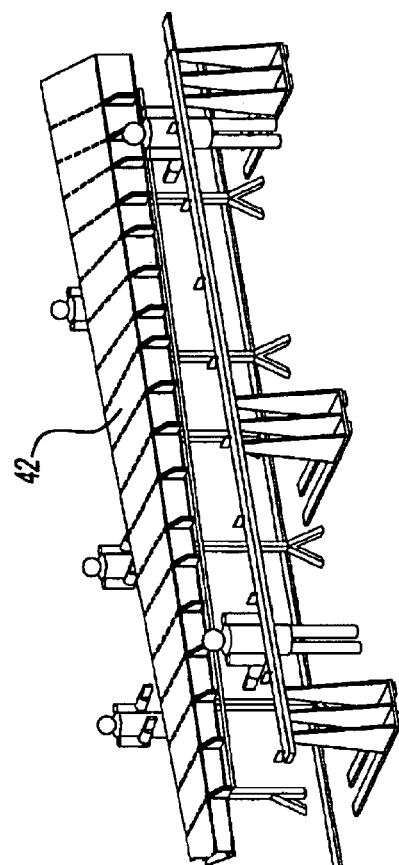
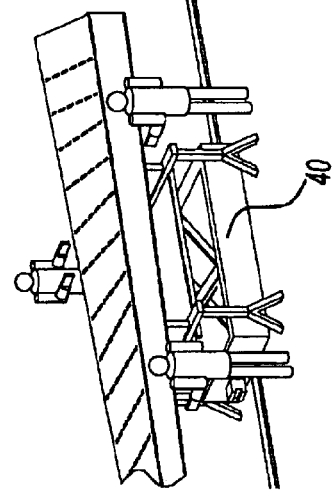
*Fig-14*
*Fig-15*

SINGLE PIECE FLOW BASED WING ASSEMBLY SYSTEM

FIELD OF THE INVENTION

The present invention relates to a method of assembling aircraft systems and, more particularly, relates to a method of assembling aircraft wings, stabilizers, or other major aircraft systems.

BACKGROUND OF THE INVENTION

Conventional manufacturing techniques for assembling components and subassemblies to produce airplane wings to a specified contour rely on fixtured "hardpoint" tooling techniques utilizing floor assembly jigs and templates to locate and temporarily fasten detailed structural parts together to locate the parts correctly relative to one another. This traditional tooling concept usually requires primary assembly tools for each subassembly produced, and two large wing major assembly tools (left and right) for final assembly of the subassemblies into a completed wing.

The assembly tooling is intended to accurately reflect the original engineering design of the product, but there are many steps between the original design of the product and the final manufacture of the tool, so it is not unusual that the tool as finally manufactured produces missized wings or wing components that would be outside of the dimensional tolerances of the original wing or wing component design unless extensive, time consuming and costly hand work is applied to correct the tooling-induced errors. More seriously, a tool that was originally built within tolerance can distort out of tolerance from the hard use it typically receives in the factory. Moreover, dimensional variations caused by temperature changes in the factory can produce a variation in the final part dimensions as produced on the tool, particularly when a large difference in the coefficient of thermal expansion exists between the tooling material and the wing material, as in the usual case where the tooling is made of steel and the wing components are made of aluminum or titanium. Since dimensions in airplane construction are often controlled to within 0.005", temperature induced dimensional variations can be significant.

Wing major tooling is expensive to build and maintain within tolerance, and requires a long lead-time to design and build. The enormous cost and long lead-time to build wing major tooling is a profound deterrent to redesigning the wing of an existing model airplane, even when new developments in aerodynamics are made, because the new design would necessitate rebuilding all the wing major tools and some or all of the wing component tooling.

The capability of quickly designing and building custom wings for airline customers having particular requirements not met by existing airplane models would give an airframe manufacturer an enormous competitive advantage. Currently, that capability does not exist because the cost of the dedicated wing major tooling and the factory floor space that such tooling would require are prohibitively expensive. However, if the same tooling that is used to make the standard wing for a particular model could be quickly and easily converted to building a custom wing meeting the particular requirements of a customer, and then converted back to the standard model or another custom wing design, airplanes could be offered to customers with wings optimized specifically to meet their specific requirements. The only incremental cost of the new wing would be the engineering and possibly some modest machining of headers and other low cost tooling that would be unique to that wing design.

The disadvantages of manufacturing processes using hard tooling are inherent. Although these disadvantages can be minimized by rigorous quality control techniques, they will always be present to some extent in the manufacture of large mechanical structures using hard tooling. A determinant assembly process has been developed and is in production for airplane fuselage manufacture, replacing hardpoint tooling with self-locating detail parts that determine the configuration of the assembly by their own dimensions and certain coordinating features incorporated into the design of the parts. This new process, shown in U.S. Pat. No. 5,560,102 entitled "Panel and Fuselage Assembly" by Micale and Strand, has proven to produce far more accurate assemblies with much less rework. Application of the determinant assembly process in airplane wing manufacture should yield a better process that eliminates or minimizes the use of hard tooling while increasing both the production capacity of the factory and increasing the quality of the product by reducing part variability while reducing the costs of production and providing flexibility in making fast design changes available to its customers. These improvements would be a great boon to airframe manufacturers and its customers and would improve the manufacturer's competitive position in the marketplace. The present invention is a significant step toward such a process.

SUMMARY OF THE INVENTION

According to the principles of the present invention, an advantageous method of assembling an aircraft wing is provided. The method employs modular vehicles in an autonomous, ground-based transportation system to reduce cycle time. These vehicles operate synchronously relative to each other and increase flexibility and reduce the amount of necessary floor space. Variation between parts and the associated costs of assembly are reduced through this method of progressive assembling the aircraft wing through a number of assembly stations using single piece flow and determinant assembly for part to part indexing. Additionally, the present invention provides a method of horizontally building an aircraft wing, which eliminates the high costs associated with scaffolding, tools, and fall protection associated with conventional build methods.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 14 is a perspective schematic view illustrating the boring and machining of the wing; and FIG. 15 is a perspective schematic view illustrating the fastening of fittings and the like to the wing.

DETAILED DESCRIPTION OF THE PREFERRED EMBODIMENT

Figure 1:
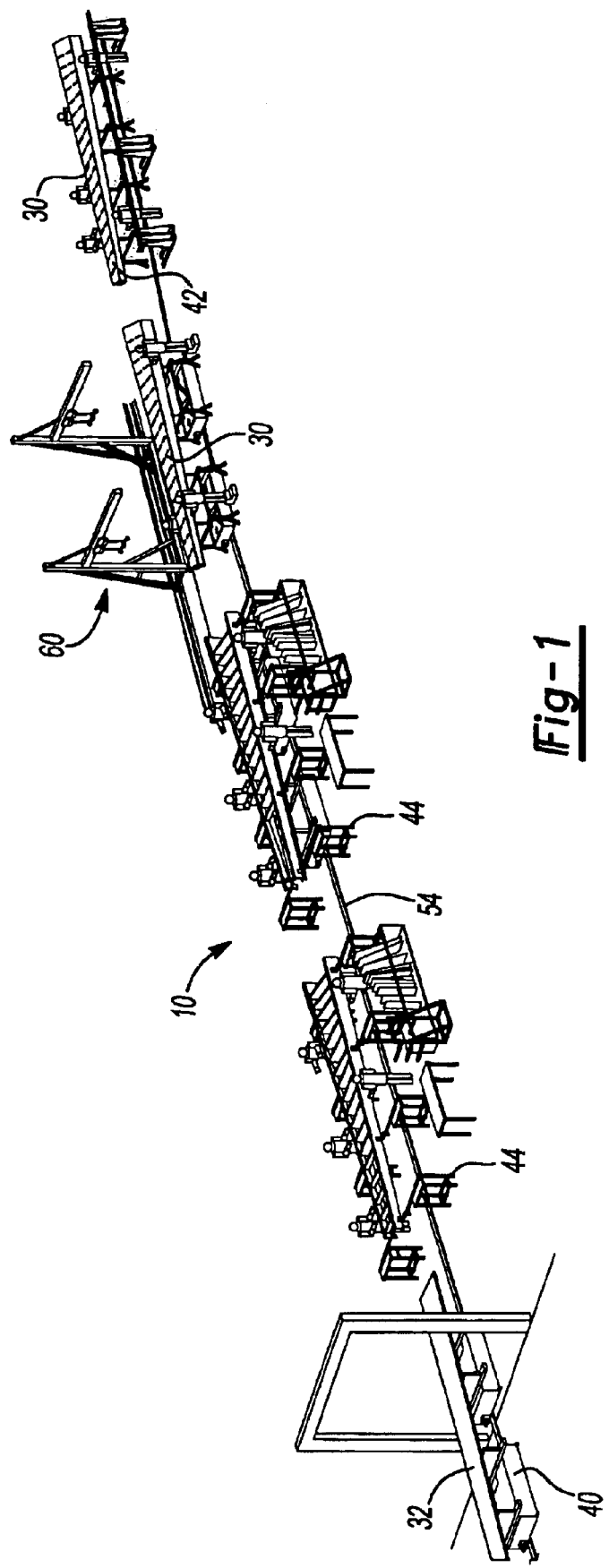
FIG. 1 is a perspective schematic view illustrating an assembly method for an aircraft wing in accordance with the principles of the present invention.

The following description of the preferred embodiment is merely exemplary in nature and is in no way intended to limit the invention, its application, or uses. That is, it is contemplated that this invention has general application to the assembly of parts into major assemblies where adherence to a specified set of dimensional tolerances is desired, particularly where some or all of the parts and subassemblies or flexible or semi-flexible.

Referring now to the drawings, where like reference numerals designate identical or corresponding parts, perspective schematic drawings illustrate the major process steps in the wing assembly system 10 according to the principles of the present invention. The process begins with building the major components of the wing, including upper and lower wing panels 30 and 32, a rear spar 34, a front spar 36, and in-spar ribs 38. The major components are brought together on an automated ground vehicle 40 and assembled as a wing or stabilizer 42 in the horizontal position at a plurality of workstations. The present invention provides a number of advantages over conventional methods. For example, the present invention is capable of employing determinant assembly to limit the need for large tooling, such as wing majors and the like, which may reduce cost by more than 50 percent. Additionally, the present invention is capable of eliminating duplicate processes through the use of a single piece flow, which further enables a one-day manufacturing rate. Still further, the present invention reduces recurring costs through the use of reconfigurable mechanisms. Moreover, the present invention is capable of being quickly and conveniently modified in order to cost effectively manufacture custom wing designs.

According to the present embodiment, the assembly of horizontal stabilizer 42 is completed at four separate and distinct workstations. Each workstation is responsible for the assembly, processing, and/or preparation of the horizontal stabilizer 42. Each of the workstations is described in detail with reference to the following figures.

Figure 2:
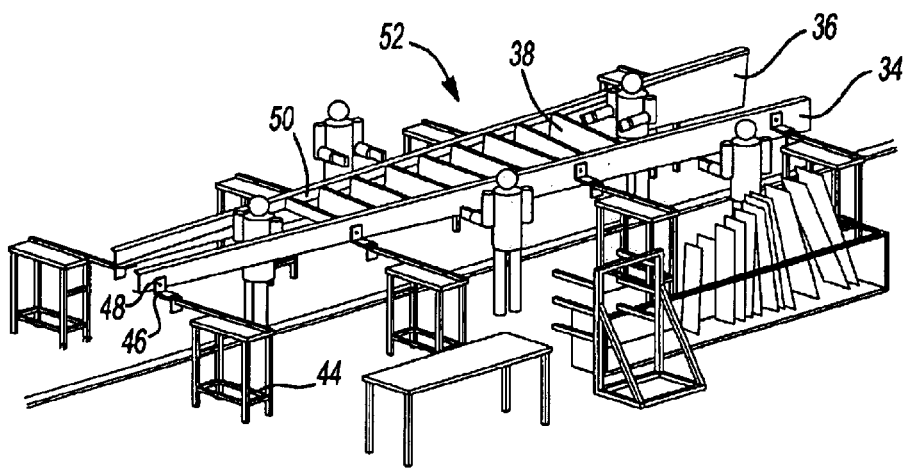
FIG. 2 is a perspective schematic view illustrating the assembly method of the pair of wing spars and ribs.

With particular reference to FIG. 2, it should be appreciated that the following assembly method employs the determinant assembly process described in detail in U.S. Pat. Nos. 5,560,102 and 6,314,630, which are commonly assigned to the assignee of the present application. The disclosures of which are incorporated herein by reference. A rear spar 34 and front spar 36 are each coupled to and supported by a plurality of support stanchions 44. Support stanchions 44 each includes at least one support bracket 46 that is coupled to rear spar 34 or front spar 36 at connection points 48. Support stanchions 44 may be of any shape sufficient to support to the weight of the wing spar. Preferably, support stanchions 44 support rear spar 34 and front spar 36 in a generally horizontal position. This position provides a number of advantages over conventional assembly methods in that it reduces the need for large tooling, which typically extends vertically and requires the associated large-scale buildings and floor space.

Rear spar 34 and front spar 36 each includes a plurality of holes 50 formed therethrough that are adapted to receive a fastener, such as an interference fastener. The plurality of holes 50 are preferably formed according to a predetermined tolerance such that at least some may be used to properly position in-spar ribs 38 relative thereto according to a predetermined layout, such as engineering drawings. As the plurality of support stanchions 44 support rear spar 34 and front spar 36, in-spar ribs 38 are assembled therebetween according to known methods. That is, in-spar ribs 38 are mounted in a generally orthogonal position relative to rear spar 34 and front spar 36 and fasten thereto via a plurality of fasteners (not shown).

Figure 3:
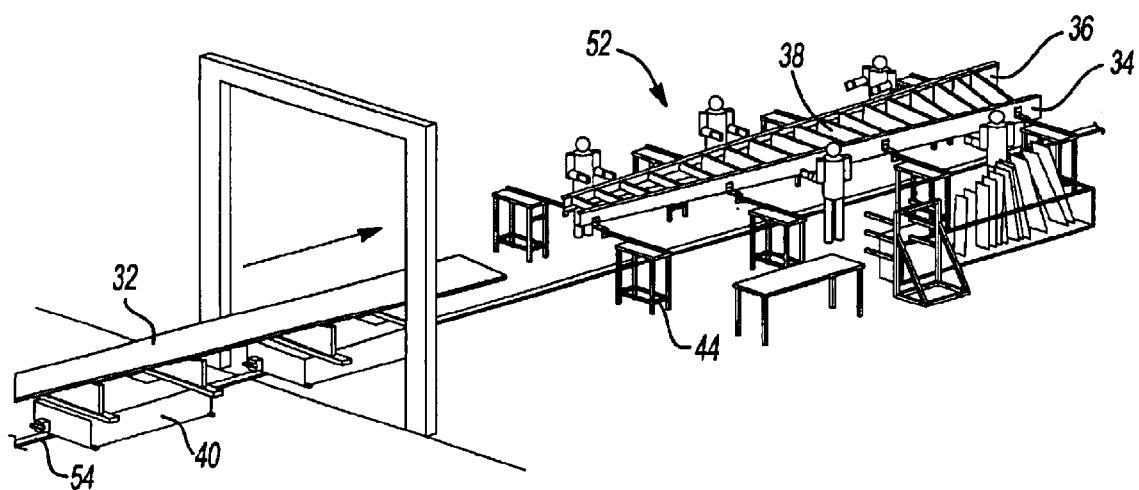
FIG. 3 is a perspective schematic view illustrating the moving of the lower wing panel on the automated ground vehicle.
Figure 4:
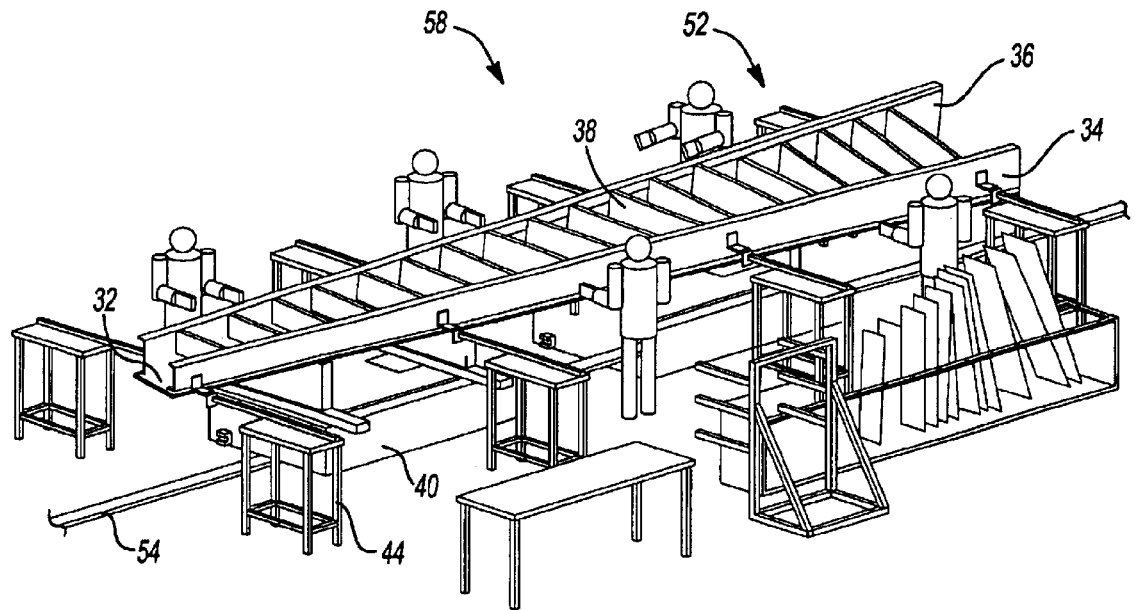
FIG. 4 is a perspective schematic view illustrating the positioning of the lower wing panel below the egg crate assembly.

As best seen in FIGS. 3 and 4, once rear spar 34, front spar 36, and the plurality of in-spar ribs 38 are coupled together to form an egg crate assembly 52, lower wing panel 32 may then be brought into position below egg crate assembly 52. More particularly, as seen in FIG. 3, lower wing panel 32 is positioned upon and supported by automated ground vehicle 40. According to the present embodiment, automated ground vehicle 40 is operably coupled to a drive track 54 formed within the floor of the building. Automated ground vehicle 40 may include a plurality of contoured support fins 56, which are configured to support a specific lower wing panel configuration. As should be appreciated from FIG. 4, the plurality of support stanchions 44 are configured such that automated ground vehicle 40 and lower wing panels 32 may be easily and conveniently positioned below egg crate assembly 52.

Figure 5:
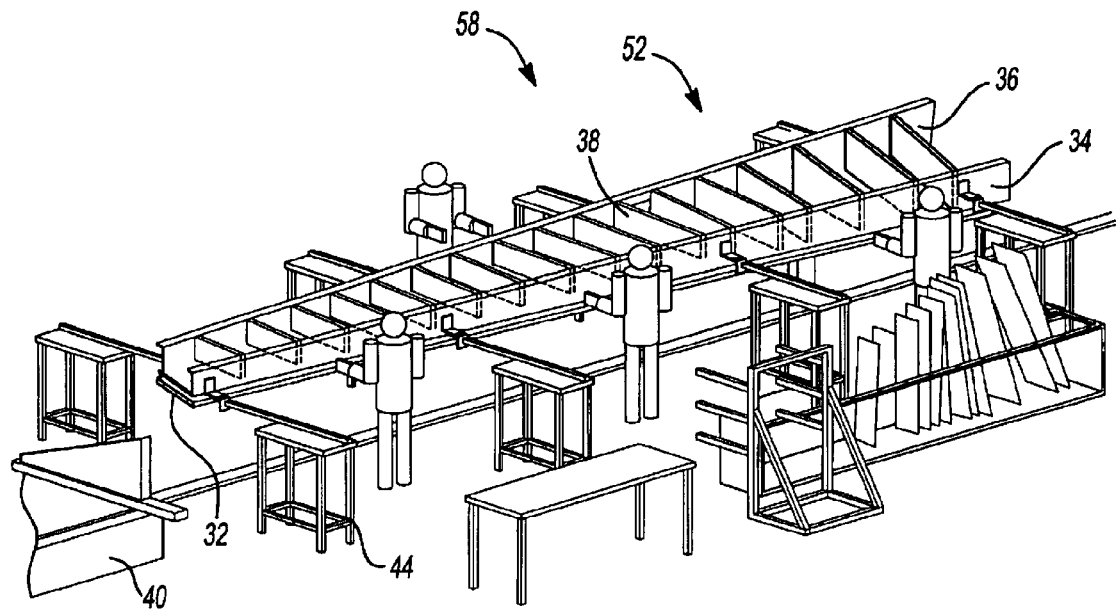
FIG. 5 is a perspective schematic view illustrating the drilling of the lower wing panel and egg crate assembly.

Lower wing panel 32 further includes a plurality of holes formed therein to properly position lower wing panel 32 relative to egg crate assembly 52. Once lower wing panel 32 and automated ground vehicle 40 are positioned below egg crate assembly 52, lower wing panel 32 is raised so as to come generally in contact with egg crate assembly 52. At this point, lower wing panel 32 and egg crate assembly 52 may be further processed, which may include the drilling of lower wing panel 32 relative to egg crate assembly 52 using numerically controlled track drills. Finally, as each drilling zone is completed as seen in FIG. 5, lower wing panel 32 may be temporarily fasten to egg crate assembly 52 using temporary fasteners to form a wing box 58 for further processing at subsequent workstations.

Figure 6:
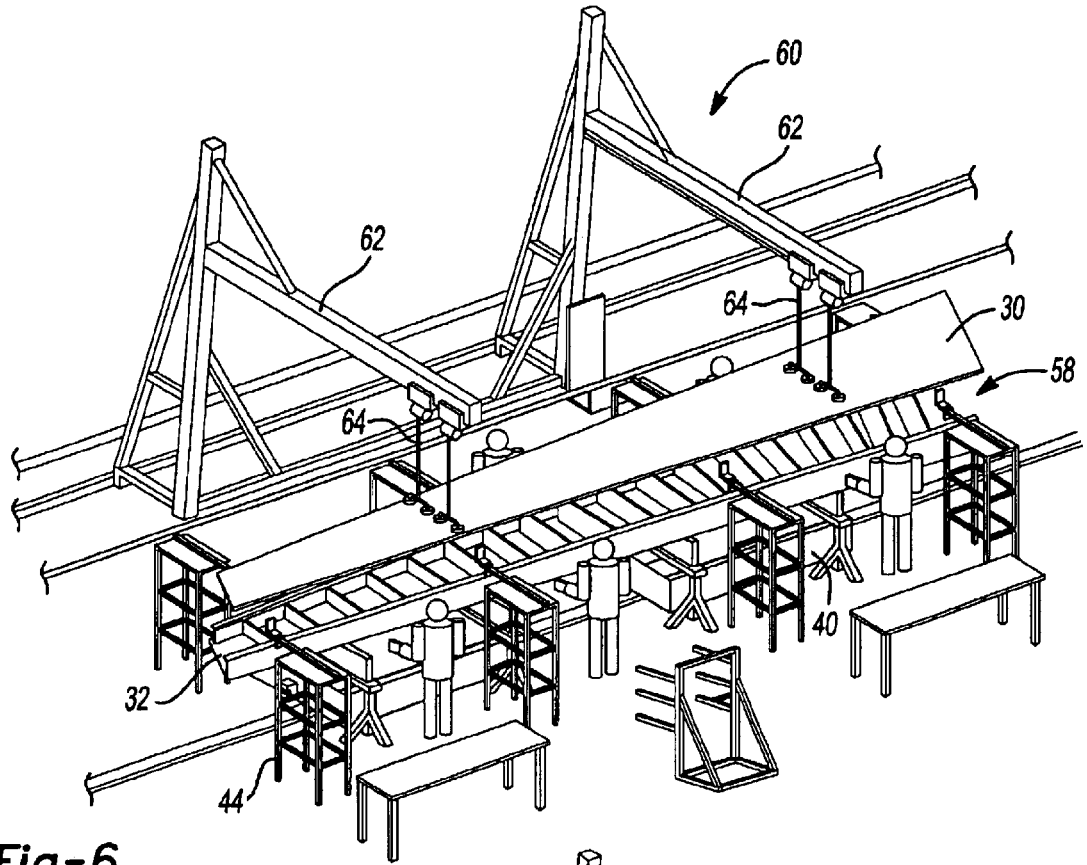
FIG. 6 is a perspective schematic view illustrating the positioning of the upper wing panel above the egg crate assembly.
Figure 7:
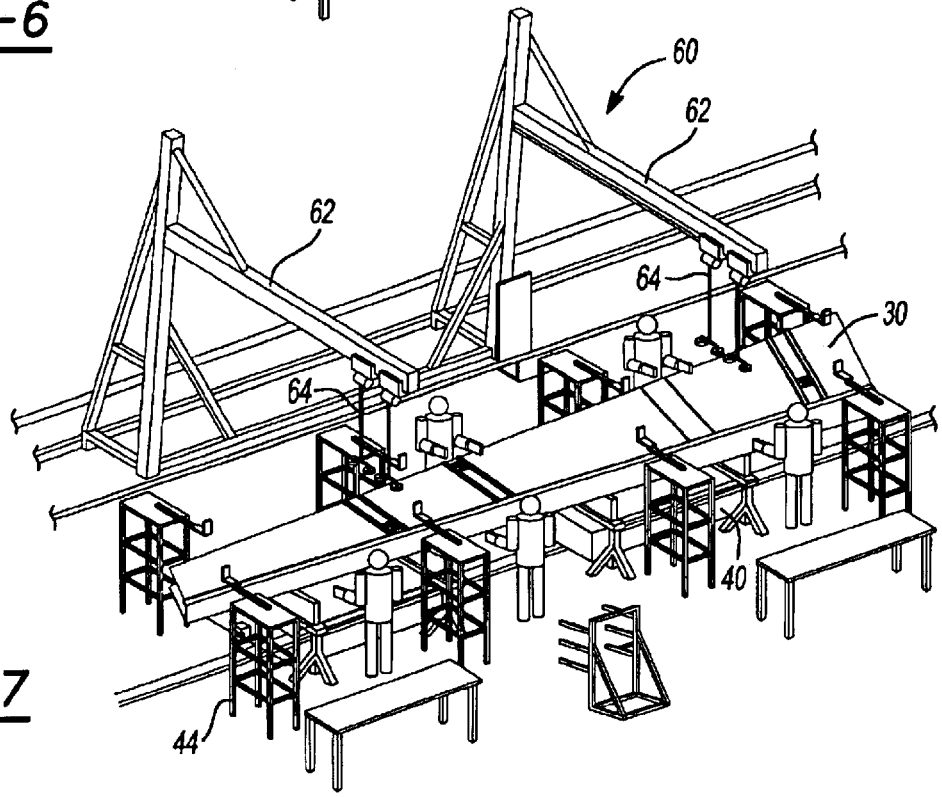
FIG. 7 is a perspective schematic view illustrating the drilling of the upper wing panel and egg crate assembly.

With particular reference to FIGS. 6 and 7, automated ground vehicle 40 transfers wing box 58 from workstation 1 to workstation 2 for the assembly of upper wing panel 30. To this end, automated ground vehicle 40 positions wing box 58 generally adjacent an overhead material handling systems 60. As best seen in FIGS. 1, 6, and 7, overhead material handling system 60 is adapted to support upper wing panel 30 between workstations 2 and 3. Overhead material handling system 60 includes a pair of outrigger supports 62 extending generally horizontal above wing box 58. A plurality of support tethers 64 releasably couple upper wing panel 30 to the pair of outrigger supports 62. It should be understood that the moving of wing box 58, which as previously mentioned includes egg crate assembly 52 and lower wing panel 32, on transport vehicle 40 from workstation 1 to a workstation 2 may be automatically performed at a predetermined time interval. Additionally, this predetermined time interval may be interruptible depending upon work completed.

Once automated ground vehicle 40 and wing box 58 are generally in position, overhead material handling systems 60 lowers upper wing panel 30 down on to wing box 58. Upper wing panel 30 may now be drilled or otherwise finished using conventional finishing tools, such as numerically controlled track drills and the like.

Figure 8:
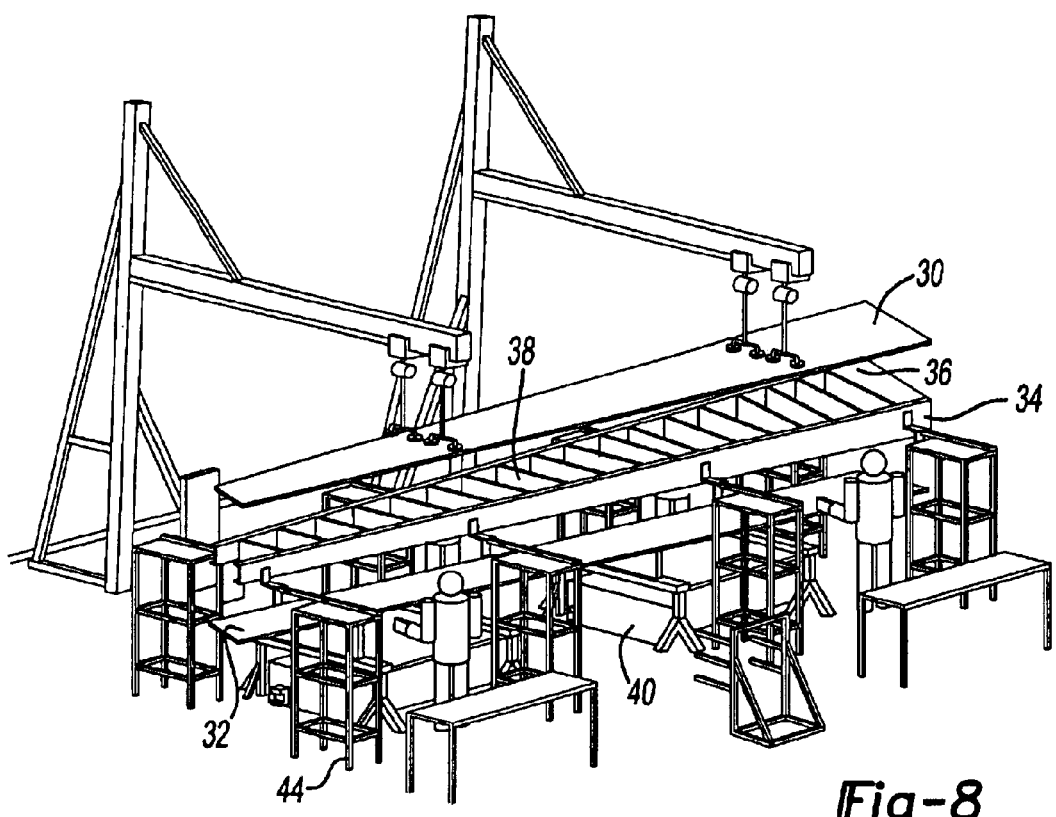
FIG. 8 is a perspective schematic view illustrating the separation of the upper wing panel and the lower wing panel from the egg crate assembly.
Figure 9:
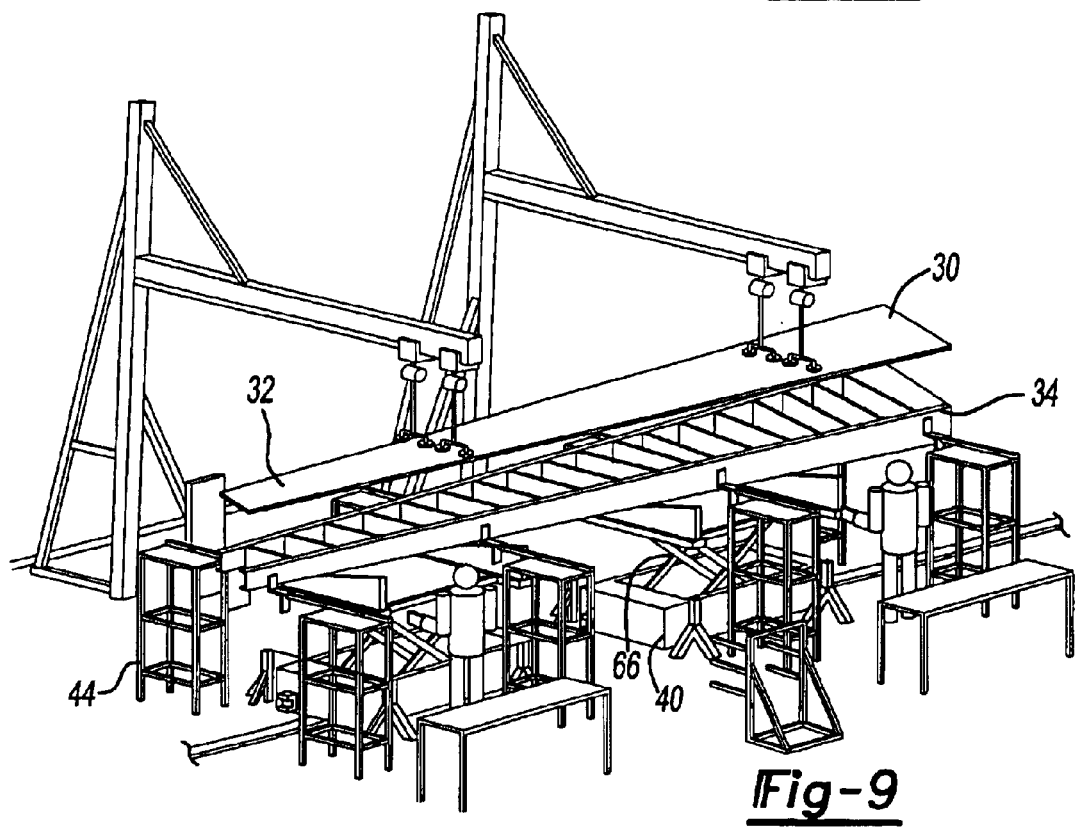
FIG. 9 is a perspective schematic view illustrating the loading of the lower wing panel and egg crate assembly upon the automated ground vehicle.

Following the finishing of upper wing panel 30, upper wing panel 30 and lower wing panel 32 are removed from egg crate assembly 52, as seen in FIG. 8. Upper wing panel 30 and lower wing panel 32 are removed from egg crate assembly 52 so as to enable the cleaning and deburring of upper wing panel 30 and lower wing panel 32. During this time, egg crate assembly 52 is supported by support stanchions 44; however, is important to note that support stanchions 44 are taller than those used at the preceding workstation to provide additional workspace.

Following the cleaning and deburring of the assembly parts, and any additional finishing that may be required, automated ground vehicle 40 is then actuated to raise lower wing panel 32 back into position adjacent egg crate assembly 52 and raise egg crate assembly 52 off support stanchions 44. To this end, automated ground vehicle 40 includes a plurality of scissor-like linkages 66 that are power actuated to extend and to retract to facilitate such raising and lowering of lower wing panel 32 and egg crate assembly 52.

Figure 10:
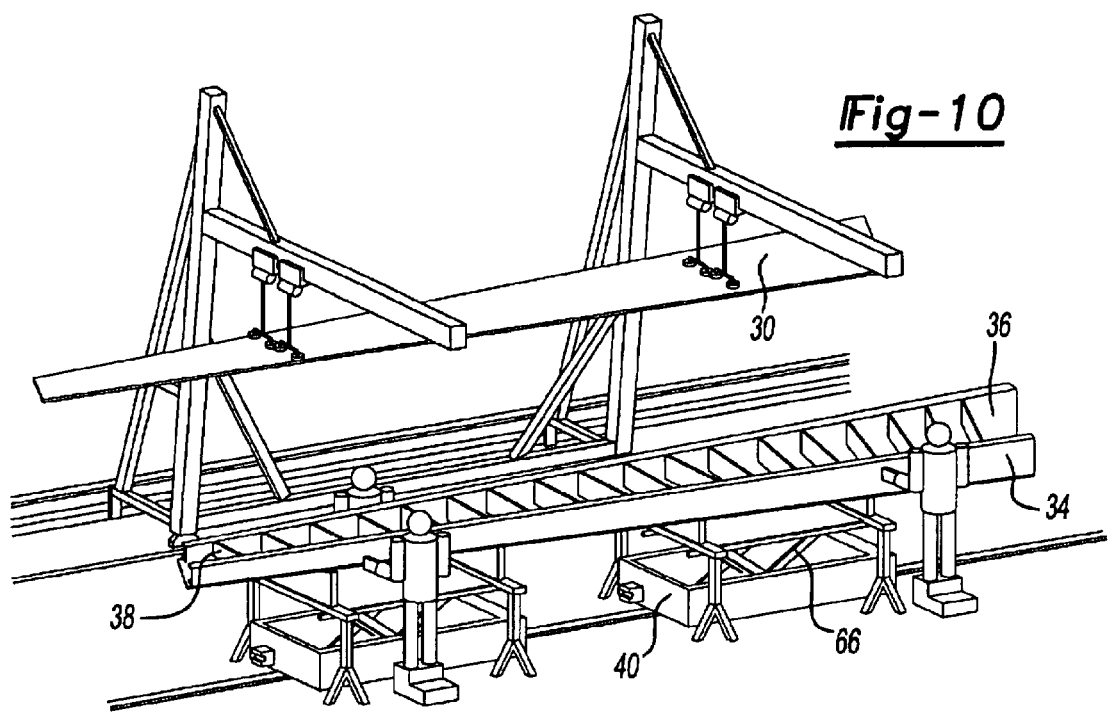
FIG. 10 is a perspective schematic view illustrating the moving of the lower wing panel on the automated ground vehicle to the third workstation.
Figure 11:
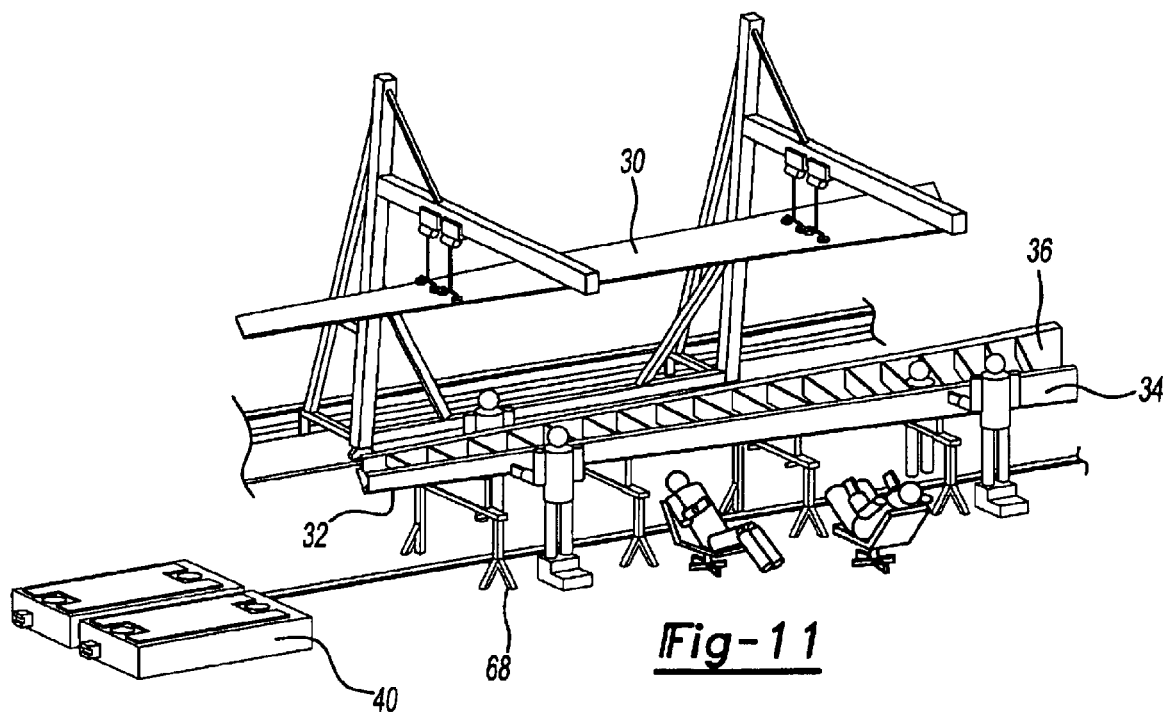
FIG. 11 is a perspective schematic view illustrating the finishing and fastening of the lower wing panel to the egg crate assembly.

As best seen in FIG. 10, automated ground vehicle 40, together with lower wing panel 32 and egg crate assembly 52, is moved to workstation 3. Simultaneously, overhead material handling systems 60, together with upper wing panel 30, is similarly moved to workstation 3. Automated ground vehicle 40 is actuated to raise lower wing panel 32 and egg crate assembly 52. Lower wing panel 32 and egg crate assembly 52 are then lowered upon precision index cones 68. As seen in FIG. 11, automated ground vehicle 40 may then be removed to provide additional work area below lower wing panel 32. Still referring to FIG. 11, lower wing panel 32 is then fay sealed and fasten to egg crate assembly 52 via permanent fasteners. This process can be conveniently completed from below lower wing panel 32 and egg crate assembly 52.

Figure 12:
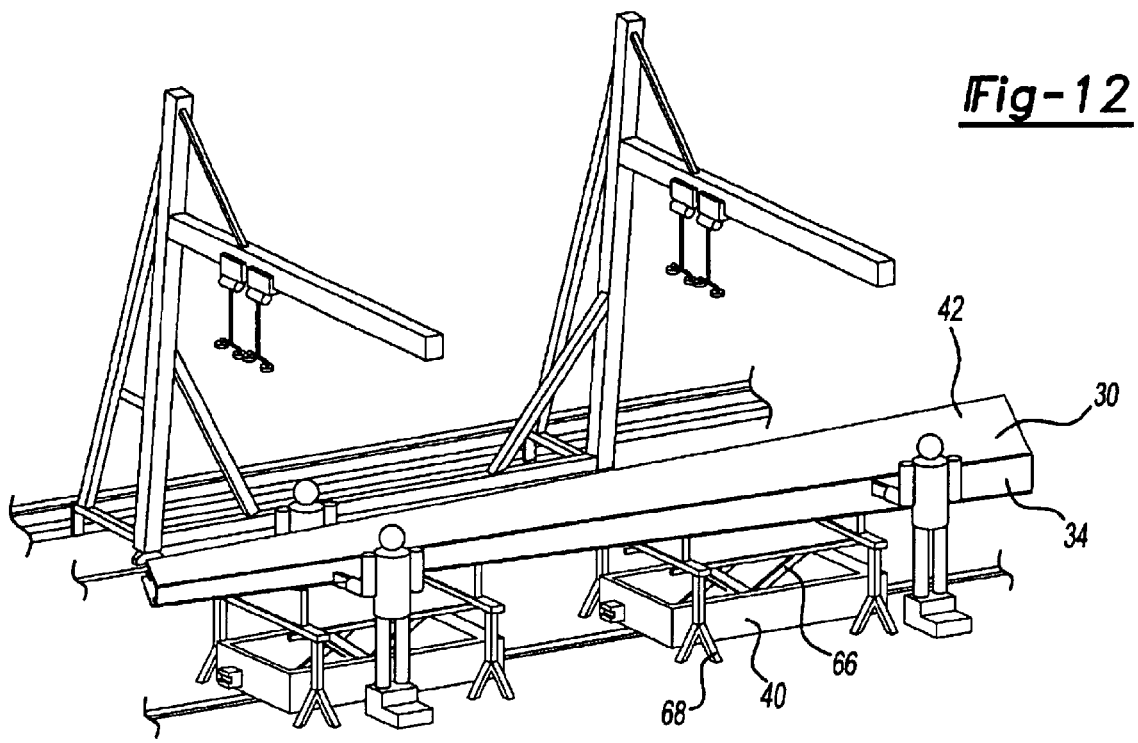
FIG. 12 is a perspective schematic view illustrating the finishing and fastening of the upper wing panel to the egg crate assembly.

As seen in FIG. 12, upper wing panel 30 may then be fay sealed and fasten to egg crate assembly 52 via permanent fasteners. Following completion of the attachment of upper wing panel 32 to egg crate assembly 52, automated ground vehicle 40 is then repositioned below now assembled wing 42 and actuated to raise wing 42 off precision index cones 68.

Figure 13:
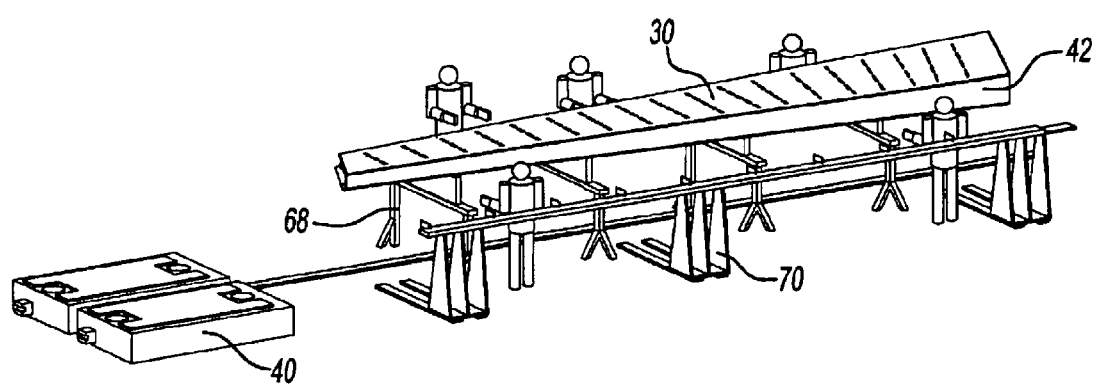
FIG. 13 is a perspective schematic view illustrating the moving of the wing to the fourth workstation.

Automated ground vehicle 40 then transports wing 42 to workstation 4 and positions wing 42 upon additional precision index cones 68. Automated ground vehicle 40 may then be removed to provide additional work area below and/or around wing 42 as shown in FIG. 13. With particular reference to FIGS. 14 and 15, a boring fixture 70 is then actuated and positioned adjacent to wing 42. Boring fixture 70 bores rear spar 34 or front spar 36 for the attachment of hinge ribs, fittings, and/or the like.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of assembling a wing comprising:
providing a first wing component having a first plurality of coordination features disposed in predetermined positions along said first wing component;
supporting said first wing component in a generally horizontal position at a first workstation;
providing a second wing component having a second plurality of coordination features disposed in predetermined positions;
accurately fastening said second wing component relative to said first wing component at said first workstation such that at least some of said first plurality of coordination features cooperate with at least some of said second plurality of coordination features to define an assembly;
moving said assembly on a transport vehicle from said first workstation to a second workstation, said second workstation being separate from said first workstation;
providing a third wing component having a third plurality of coordination features disposed in predetermined positions;
accurately fastening said third wing component relative to said assembly at said second workstation such that at least some of said third plurality of coordination features cooperate with at least some of said first or second plurality of coordination features to define an assembly.

2. The method according to claim 1 wherein said moving said assembly on said transport vehicle from said first workstation to a second workstation is automatically performed at a predetermined time interval, said predetermined time interval being interruptible depending upon work completed.

3. The method according to claim 1 wherein work to be performed at said first workstation is distinct from work to be performed at said second workstation so as to define a pulsed flow based assembly process.

4. A method of assembling a wing comprising:
providing a first spar and a second spar, each of said first spar and said second spar having a plurality of spar coordination features disposed in predetermined positions along said first spar and said second spar;
supporting said first spar and said second spar in a generally horizontal position upon a plurality of support stanchions at a first workstation;
providing a plurality of in-spar ribs having a plurality of rib coordination features disposed in predetermined positions;
accurately fastening each of said plurality of in-spar ribs relative to said first spar and said second spar at said first workstation such that at least some of said plurality of rib coordination features cooperate with at least some of said plurality of spar coordination features to define an egg crate assembly;

moving a lower wing panel on an automated transport vehicle into a position below and generally parallel to said egg crate assembly at said first workstation, said lower wing panel having a plurality of panel coordination features disposed in predetermined positions;

releasably mounting said lower wing panel to said egg crate assembly;

moving said egg crate assembly and said lower wing panel on said transport vehicle from said first workstation to a second workstation, said second workstation being separate from said first workstation;

moving an upper wing panel using a material handling system into a position above and generally parallel to said egg crate assembly at said second workstation, said upper wing panel having a plurality of panel coordination features disposed in predetermined positions;

releasably mounting said upper wing panel to said egg crate assembly;

finishing at least one of said upper wing panel, said lower wing panel, and said egg crate assembly; and fixedly coupling said lower wing panel and said upper wing panel to said egg crate assembly such that at least some of said plurality of panel coordination features cooperate with at least some of said plurality of spar coordination features.

5. The method according to claim 4 wherein said releasably mounting said lower wing panel to said egg crate assembly comprises:

drilling a plurality of holes in said lower wing panel and said egg crate assembly using a numerically controlled machine tool.

6. The method according to claim 4 wherein said releasably mounting said upper wing panel to said egg crate assembly comprises:

drilling a plurality of holes in said upper wing panel and said egg crate assembly using a numerically controlled machine tool.

7. The method according to claim 4 wherein said moving said egg crate assembly and said lower wing panel on said transport vehicle from said first workstation to a second workstation is automatically performed at a predetermined time interval, said predetermined time interval being interruptible depending upon work completed.

8. The method according to claim 4 wherein said finishing at least one of said upper wing panel, said lower wing panel, and said egg crate assembly comprises:

deburring at least one of said upper wing panel, said lower wing panel, and said egg crate assembly; and applying sealant to at least one of said upper wing panel, said lower wing panel, and said egg crate assembly.

9. The method according to claim 4 wherein work to be performed at said first workstation is distinct from work to be performed at said second workstation so as to define a pulsed flow based assembly process.

10. The method according to claim 4, further comprising:

moving said egg crate assembly, said upper wing panel, and said lower wing panel to a third workstation using said transport vehicle prior to said finishing at least one of said upper wing panel, said lower wing panel, and said egg crate assembly; said third workstation being separate from said first workstation and said second workstation.

11. The method according to claim 4, further comprising:

transferring said lower wing panel and said egg crate assembly to a plurality of support members prior to said finishing at least one of said upper wing panel, said lower wing panel, and said egg crate assembly using said transport vehicle.

12. The method according to claim 4, further comprising:

moving said upper wing panel, said lower wing panel, and said egg crate assembly on said transport vehicle to a third workstation following said fixedly coupling said upper wing panel and said lower wing panel to said egg crate assembly; and machining said upper wing panel, said lower wing panel, and said egg crate assembly.

13. A method of assembling a wing comprising:

providing a first spar and a second spar, each of said first spar and said second spar having a plurality of spar coordination features disposed in predetermined positions along said first spar and said second spar;

supporting said first spar and said second spar in a generally horizontal position at a first workstation;

providing a plurality of in-spar ribs having a plurality of rib coordination features disposed in predetermined positions;

accurately positioning each of said plurality of in-spar ribs relative to said first spar and said second spar at said first workstation such that at least some of said plurality of rib coordination features cooperate with at least some of said plurality of spar coordination features to define an egg crate assembly;

fastening each of said plurality of in-spar ribs to said first spar and said second spar at said first workstation;

moving a lower wing panel into a position below and generally parallel to said egg crate assembly at said first workstation, said lower wing panel having a plurality of panel coordination features disposed in predetermined positions;

releasably mounting said lower wing panel to said egg crate assembly such that at least some of said plurality of panel coordination features of said lower wing panel cooperate with at least some of said plurality of spar coordination features;

moving said egg crate assembly and said lower wing panel from said first workstation to a second workstation, said second workstation being separate from said first workstation;

moving an upper wing panel into a position above and generally parallel to said egg crate assembly at said second workstation, said upper wing panel having a plurality of panel coordination features disposed in predetermined positions;

releasably mounting said upper wing panel to said egg crate assembly such that at least some of said plurality of panel coordination features of said upper wing panel cooperate with at least some of said plurality of spar coordination features;

separating said upper wing panel and said lower wing panel from said egg crate assembly;

finishing at least one of said upper wing panel, said lower wing panel, and said egg crate assembly;

fixedly coupling said lower wing panel to said egg crate assembly such that at least some of said plurality of panel coordination features of said lower wing panel cooperate with at least some of said plurality of spar coordination features; and fixedly coupling said upper wing panel to said egg crate assembly such that at least some of said plurality of panel coordination features of said upper wing panel cooperate with at least some of said plurality of spar coordination features.

14. The method according to claim 13 wherein said moving said lower wing panel into said position below and generally parallel to said egg crate assembly at said first workstation includes providing a ground vehicle, actuating said ground vehicle to carry said lower wing panel to said position below and generally parallel to said egg crate assembly, actuating said ground vehicle to raise said lower wing panel generally adjacent to said egg crate assembly.

15. The method according to claim 14 wherein said moving said egg crate assembly and said lower wing panel from said first workstation to said second workstation includes actuating said ground vehicle to carry said lower wing panel and said egg crate assembly from said first workstation to said second workstation.

16. The method according to claim 15 wherein said moving said egg crate assembly and said lower wing panel from said first workstation to said second workstation is automatically performed at a predetermined time interval, said predetermined time interval being interruptible depending upon work completed.

17. The method according to claim 13 wherein said releasably mounting said lower wing panel to said egg crate assembly comprises:
drilling a plurality of holes in said lower wing panel and said egg crate assembly using a numerically controlled machine tool.

18. The method according to claim 13 wherein said releasably mounting said upper wing panel to said egg crate assembly comprises:
drilling a plurality of holes in said upper wing panel and said egg crate assembly using a numerically controlled machine tool.

19. The method according to claim 13 wherein said supporting said first spar and said second spar in said generally horizontal position at said first work station includes providing a plurality of support stanchions and engaging said plurality of support stanchions with said first spar and said second spar to support said spars in said generally horizontal position.

20. The method according to claim 13 wherein said separating said upper wing panel and said lower wing panel from said egg crate assembly comprises:

supporting said egg crate assembly upon a second plurality of support stanchions located at said second workstation;
supporting said lower wing panel upon a ground vehicle; and
supporting said upper wing panel with an overhead material handling system.

21. The method according to claim 14 wherein said finishing at least one of said upper wing panel, said lower wing panel, and said egg crate assembly comprises:
deburring at least one of said upper wing panel, said lower wing panel, and said egg crate assembly; and
applying sealant to at least one of said upper wing panel, said lower wing panel, and said egg crate assembly.

22. The method according to claim 14 wherein work to be performed at said first workstation is distinct from work to be performed at said second workstation so as to define a pulsed flow based assembly process.

23. The method according to claim 14, further comprising:
moving said egg crate assembly, said upper wing panel, and said lower wing panel to a third workstation prior to said finishing at least one of said upper wing panel, said lower wing panel, and said egg crate assembly; said third workstation being separate from said first workstation and said second workstation.

24. The method according to claim 14, further comprising:
transferring said lower wing panel and said egg crate assembly to a plurality of support members prior to said finishing at least one of said upper wing panel, said lower wing panel, and said egg crate assembly.

25. The method according to claim 14, further comprising:
moving said upper wing panel, said lower wing panel, and said egg crate assembly to a third workstation following said fixedly coupling said upper wing panel and said lower wing panel to said egg crate assembly; and
machining said upper wing panel, said lower wing panel, and said egg crate assembly.

* * * * *